United States Patent
Yamaguchi et al.

(10) Patent No.: US 10,548,427 B2
(45) Date of Patent: *Feb. 4, 2020

(54) SHEET FOR EXTRACTION, EXTRACTION FILTER, AND EXTRACTION BAG

(71) Applicant: OHKI CO., LTD., Osaka-shi, Osaka (JP)

(72) Inventors: Naoko Yamaguchi, Osaka (JP); Yoko Mitani, Osaka (JP); Ryosuke Hayami, Osaka (JP)

(73) Assignee: OHKI CO., LTD., Osaka-shi (JP)

( * ) Notice: Subject to any disclaimer, the term of this patent is extended or adjusted under 35 U.S.C. 154(b) by 204 days.

This patent is subject to a terminal disclaimer.

(21) Appl. No.: 15/553,545

(22) PCT Filed: Mar. 9, 2016

(86) PCT No.: PCT/JP2016/057333
§ 371 (c)(1),
(2) Date: Aug. 24, 2017

(87) PCT Pub. No.: WO2016/147978
PCT Pub. Date: Sep. 22, 2016

(65) Prior Publication Data
US 2018/0028014 A1  Feb. 1, 2018

(30) Foreign Application Priority Data
Mar. 13, 2015 (JP) ................ 2015-051137

(51) Int. Cl.
*A47J 31/06* (2006.01)
*B32B 5/26* (2006.01)
(Continued)

(52) U.S. Cl.
CPC ........... *A47J 31/06* (2013.01); *B01D 11/02* (2013.01); *B32B 5/022* (2013.01); *B32B 5/26* (2013.01);
(Continued)

(58) Field of Classification Search
CPC ...................... A47J 31/06; B32B 5/26
See application file for complete search history.

(56) References Cited

U.S. PATENT DOCUMENTS 6,506,873 B1  1/2003  Ryan et al.
9,732,453 B2 * 8/2017  Saitoh .............. D04H 1/54
(Continued)

FOREIGN PATENT DOCUMENTS

EP    1 637 317 A1    3/2006
JP    2001-522412 A   11/2001
(Continued)

OTHER PUBLICATIONS

Computerized English translation to JP 2011-157118 A obtained from European Patent Office website. (Year: 2011).*
(Continued)

*Primary Examiner* — Jeremy R Pierce
(74) *Attorney, Agent, or Firm* — Oliff PLC

(57) ABSTRACT

An extraction sheet having high machinability in the manufacture of an extraction filter for beverages and an extraction filter using the same and having high handling property is provided. The extraction sheet includes a layer including a meltblown nonwoven fabric that is formed from fibers of a polylactic acid-based resin having a crystallinity of 9.0% or lower and a fiber diameter of 15.0 μm or smaller and that has a basis weight of 2.0 to 30.0 g/m2, and a layer including a spunbonded nonwoven fabric that is formed from fibers of a polylactic acid-based resin having a crystallinity of 30.0 to 60.0% and a fiber diameter of 35.0 μm or smaller and that (Continued)

has a basis weight of 5.0 to 30.0 g/m2. The extraction sheet has a bending hysteresis of $5.0 \times 10^{-3}$ to $14.5 \times 10^{-3}$ gf·cm/cm.

12 Claims, 3 Drawing Sheets

(51) Int. Cl.
| | | |
|---|---|---|
| *D04H 3/14* | (2012.01) | |
| *D04H 3/16* | (2006.01) | |
| *B65D 85/808* | (2006.01) | |
| *B32B 7/12* | (2006.01) | |
| *B32B 5/02* | (2006.01) | |
| *B32B 7/04* | (2019.01) | |
| *B01D 11/02* | (2006.01) | |
| *D04H 3/011* | (2012.01) | |
| *D04H 1/55* | (2012.01) | |
| *D04H 1/435* | (2012.01) | |
| *B65D 77/00* | (2006.01) | |

(52) U.S. Cl.
CPC .................. *B32B 7/04* (2013.01); *B32B 7/12* (2013.01); *B65D 77/00* (2013.01); *B65D 85/808* (2013.01); *D04H 1/435* (2013.01); *D04H 1/55* (2013.01); *D04H 3/011* (2013.01); *D04H 3/14* (2013.01); *D04H 3/16* (2013.01); *B32B 2250/03* (2013.01); *B32B 2250/20* (2013.01); *B32B 2250/26* (2013.01); *B32B 2260/028* (2013.01); *B32B 2260/046* (2013.01); *B32B 2262/0276* (2013.01); *B32B 2307/406* (2013.01); *B32B 2307/50* (2013.01); *B32B 2307/54* (2013.01); *B32B 2419/04* (2013.01); *B32B 2439/06* (2013.01); *B32B 2451/00* (2013.01); *Y02W 90/12* (2015.05)

(56) References Cited

U.S. PATENT DOCUMENTS

| | | | |
|---|---|---|---|
| 2005/0136155 A1* | 6/2005 | Jordan | D04H 1/56 426/77 |
| 2006/0292954 A1 | 12/2006 | Suzuka et al. | |
| 2011/0143621 A1* | 6/2011 | MacDonald | A61L 15/42 442/327 |
| 2011/0162778 A1 | 7/2011 | Suzuka et al. | |
| 2014/0242309 A1* | 8/2014 | Foss | D04H 1/54 428/35.2 |
| 2017/0016157 A1 | 1/2017 | Saitoh et al. | |

FOREIGN PATENT DOCUMENTS

| | | |
|---|---|---|
| JP | 2011-157118 A | 8/2011 |
| WO | 2015/147119 A1 | 10/2015 |

OTHER PUBLICATIONS

Jun. 7, 2016 International Search Report issued in International Patent Application No. PCT/JP2016/057333.

Oct. 4, 2018 Extended Search Report issued in European Patent Application No. 16764808.8.

\* cited by examiner

[FIG. 1]
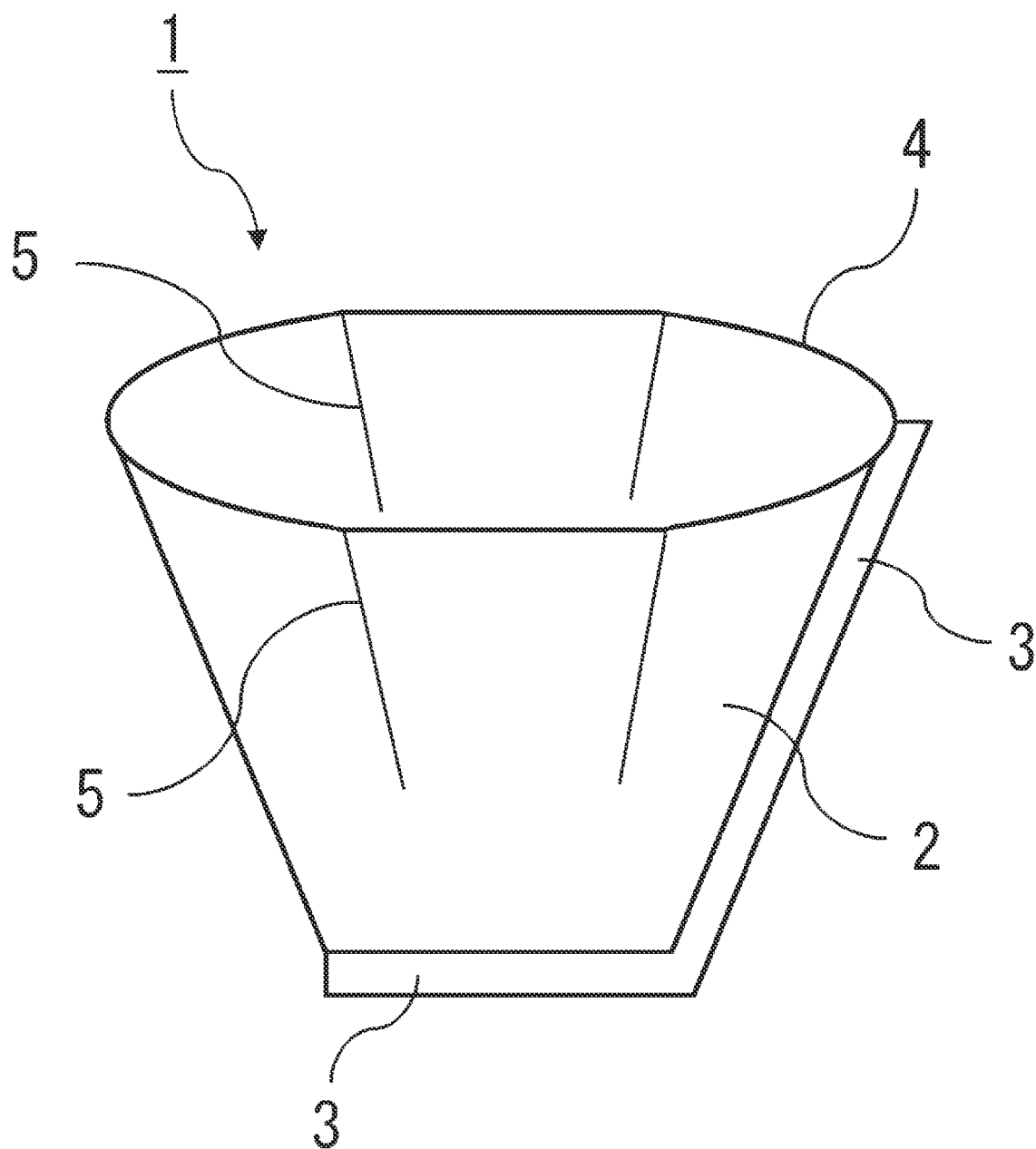

[FIG. 2]
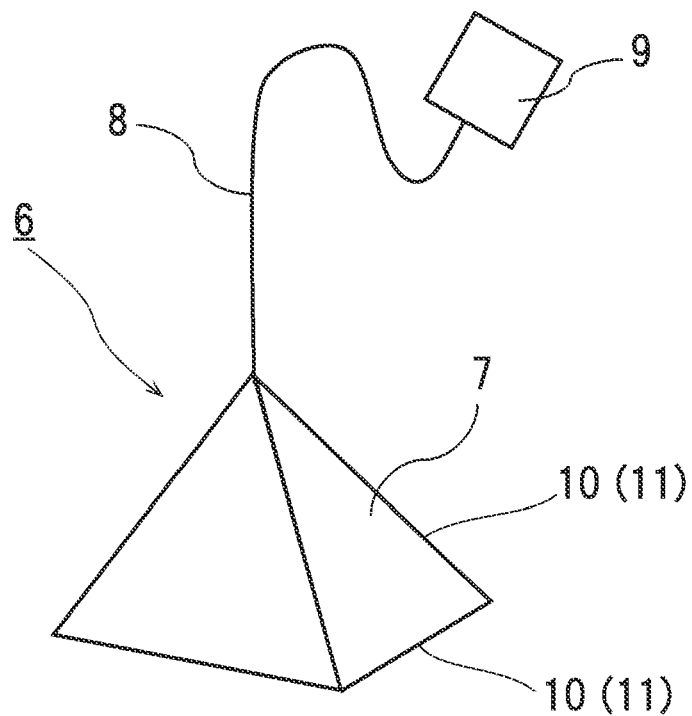
[FIG. 3]
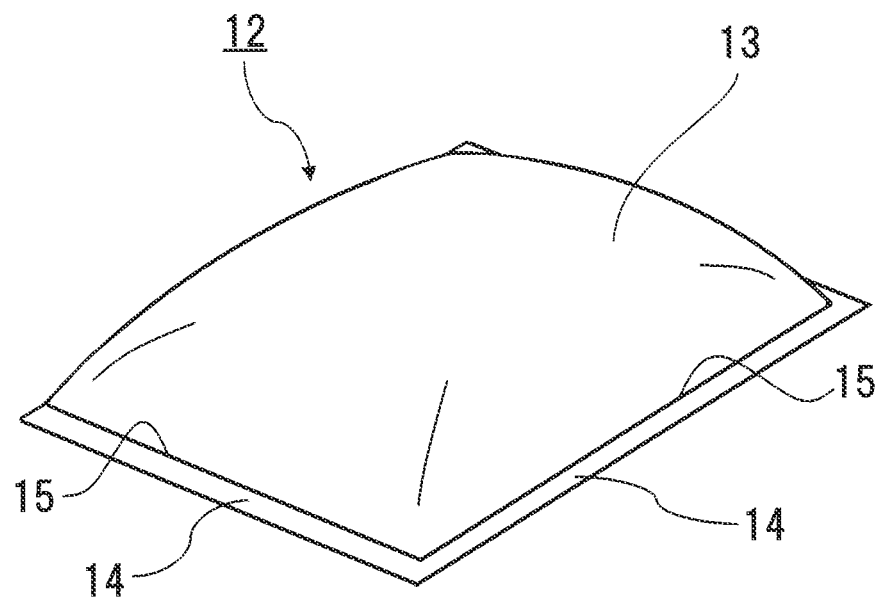

[FIG. 4]
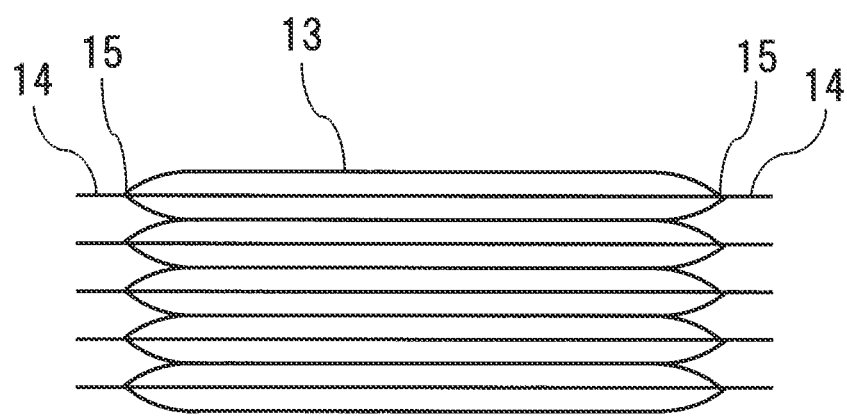

SHEET FOR EXTRACTION, EXTRACTION FILTER, AND EXTRACTION BAG

TECHNICAL FIELD

The present invention relates to an extraction sheet for extracting beverages or the like from an extraction material such as tea leaves and powder coffee, and to an extraction filter and an extraction bag formed by, for example, cutting or welding the extraction sheet (hereinafter the extraction filter and the extraction bag together may be referred to as "extraction filters"), and in particular, relates to an extraction sheet having high machinability in the manufacture of the extraction filters, and to extraction filters that are formed with the extraction sheet and have high handling property.

BACKGROUND ART

Conventionally, the extraction sheets used as the material of filters or bags for extracting beverages such as black tea, green tea, and coffee, liquid food such as soup stock, drugs such as Kampo products, or quasi drugs such as bath salts are made from a nonwoven or a woven fabric made of resin, or paper in order to increase the rate of extraction and decrease the cost. Especially in recent years, nonwoven fabrics with small basis weight have tended to be preferred owing to their improved appearance such as transparency and luster.

However, since an extraction sheet comprising a nonwoven fabric with small basis weight is generally thin and flexible, the extraction sheet is difficult to handle upon being processed into extraction filters, and thus has a problem of low machinability. In the manufacture of the extraction filters by an elongated extraction sheet comprising a nonwoven fabric, for example, the extraction sheet is so flexible that, when fed and conveyed at a high speed on a manufacturing line, the extraction sheet may fail to follow a guide member placed on the manufacturing line and meander right and left with respect to a conveyance direction. This forms inclined cutting or sealing lines, causing defective products.

In addition, since an extraction bag in the form of a pillow filled with an extraction material such as tea leaves generally swells non-uniformly with the extraction material, the extraction bags, when stacked, tends to become unsteady. In particular, since an extraction bag comprising a conventional nonwoven fabric is flexible, is easily deformed, and has a smooth surface, the stacked extraction bags are unsteady, so that the stacked extraction bags easily slip down from the upper part of the stack. Hence, it is difficult to convey the extraction bags in stack or house them in an external container, which causes a problem of poor handling property.

In contrast, an extraction sheet made of paper generally has a characteristic of being creasable. Therefore, in the manufacture of the extraction filters, for example, the guide members are placed on the manufacturing line and the extraction sheet made of paper is folded in half or otherwise bent to form a crease line along the conveyance direction of the manufacturing line, enabling the extraction sheet to be in a tight and straight condition. Thus, such an extraction sheet can be prevented from meandering.

In addition, in the manufacture of an extraction bag in the form of a pillow formed with the extraction sheet made of paper, the crease line can be appropriately formed to provide the extraction bag having improved shape retention. Thus, the extraction bags, even when stacked, can hardly slip down.

Therefore, the present inventors envisaged that if even the extraction sheet comprising a nonwoven fabric made of resin can have such a characteristic of being creasable as exhibited by paper, then the extraction sheet can be prevented from meandering in the manufacture of the extraction filters and also provide the extraction bag having improved shape retention and thus enhanced handling property.

Japanese Patent Application Publication No. 2011-157118 (Patent Literature 1) as prior-art relevant to an extraction sheet comprising a nonwoven fabric of a polylactic acid-based resin describes a filter for food comprising a laminated nonwoven fabric integrated by thermocompression bonding a spunbonded nonwoven fabric and a meltblown nonwoven fabric each of the polylactic acid-based resin. It is also described that since this filter for food has small space among fibers, the filter can prevent powder leakage, has high rigidity, and a stabilized mechanical strength and sealing strength.

Although, the filter for food described in Patent Literature 1 includes the layer of the meltblown nonwoven fabric comprising the fibers of the polylactic acid-based resin, the filter for food is nevertheless hardly creasable due to the high crystallinity of the resin forming the meltblown nonwoven fabric layer. Hence, this filter for food has a problem of failing to enhance machinability by forming the crease line.

CITATION LIST

Patent Literature

Patent Literature 1: Japanese Patent Application Publication No. 2011-157118

SUMMARY OF INVENTION

Technical Problem

In view of the above-described problems, an object of the present invention is to provide an extraction sheet that is appropriately creasable and therefore has high machinability in the manufacture of an extraction filter and an extraction bag. Another object of the present invention is to provide an extraction filter and an extraction bag that has high handling property upon being conveyed and packaged, and good extraction performance.

Solution to Problem

An extraction sheet according to a first aspect of the present invention having a multi-layered structure comprises a layer (layer M) including a meltblown nonwoven fabric that is formed from fibers of a polylactic acid-based resin having a crystallinity of 9.0% or lower and a fiber diameter of 15.0 μm or smaller and that has a basis weight of 2.0 to 30.0 g/m2, and a layer (layer S) including a spunbonded nonwoven fabric that is formed from fibers of a polylactic acid-based resin having a crystallinity of 30.0 to 60.0% and a fiber diameter of 35.0 μm or smaller and that has a basis weight of 5.0 to 30.0 g/m2, wherein the extraction sheet has a bending hysteresis of $5.0 \times 10^{-3}$ to $14.5 \times 10^{-3}$ gf·cm/cm.

A second aspect of the present invention provides the extraction sheet according to the first aspect of the present invention, wherein the fibers constituting the meltblown nonwoven fabric and the fibers constituting the spunbonded nonwoven fabric each have a fiber diameter of 0.5 μm or larger.

A third aspect of the present invention provides the extraction sheet according to the first or second aspect of the present invention, wherein the resin forming the meltblown nonwoven fabric has a softening point of 60 to 120° C., and the softening point is at least 30° C. lower than a softening point of the resin forming the spunbonded nonwoven fabric.

A fourth aspect of the present invention provides an extraction filter including the extraction sheet according to any one of the first to third aspects of the present invention, wherein the extraction filter is formed by welding and sealing the extraction sheet at a predetermined location with the layer M of the extraction sheet placed inside.

A fifth aspect of the present invention provides an extraction bag including the extraction sheet according to any one of the first to third aspects of the present invention, wherein the extraction bag is formed by welding and sealing the extraction sheet at a predetermined location with the layer M of the extraction sheet placed inside to form a bag body with which an extraction material has been filled.

Advantageous Effects of Invention (a) First Aspect of the Present Invention

Since the extraction sheet according to the first aspect of the present invention includes the layer M formed from the meltblown nonwoven fabric that is formed from fibers of the polylactic acid-based resin having a crystallinity of 9.0% or lower and a fiber diameter of 15.0 µm or smaller and that has a basis weight of 2.0 to 30.0 g/m$^2$, and has a bending hysteresis of 5.0 gf·cm/cm or larger, the extraction sheet has a characteristic of being creasable.

Therefore, in the manufacture of the extraction filters with such an extraction sheet, the guide members, for example, are placed on the manufacturing line and the extraction sheet is folded in half or otherwise bent to form the crease line along the conveyance direction of the manufacturing line, enabling the extraction sheet to be in a tight and straight condition. Consequently, the extraction sheet can be prevented from meandering upon being conveyed, for example, improve its machinability, and be prevented from causing defective products.

In addition, such an extraction sheet is creasable but nevertheless hardly in what is called the "wrinkled" condition where many unwanted crease lines or wrinkles are formed, because the extraction sheet has a bending hysteresis of $14.5 \times 10^{-3}$ gf·cm/cm or smaller. Thus, the extraction sheet hardly impairs its good appearance.

The term "bending hysteresis" as used herein refers to an index that shows the recovering ability of the extraction sheet upon unloading after the sheet is bent by loading. The higher the index value, the more hardly the extraction sheet will recover and the more creasable the extraction sheet will be.

In addition, in the manufacture of such an extraction sheet into an extraction bag in the form of a pillow filled with an extraction material, the crease line can be appropriately formed to provide the extraction bag having improved shape retention. Thus, the extraction bags, even when stacked, can be steady and hardly slip down. Hence, a method of packaging can be employed such that the extraction bags in stack are conveyed as a whole, and are housed as a whole in one external container. Therefore, the extraction bags have high handling property and can enhance the manufacturing efficiency.

Furthermore, since the above-described extraction sheet comprises the layer S including the spunbonded nonwoven fabric that is formed from fibers of the polylactic acid-based resin having a crystallinity of 30.0 to 60.0% and a fiber diameter of 35.0 µm or smaller and that has a basis weight of 5.0 to 30.0 g/m$^2$, the extraction sheet has a high tensile strength and is firm.

(b) Second Aspect of the Present Invention

According to the second aspect of the present invention, in addition to the advantages described in (a) above, the following particular effects can be achieved. That is, the extraction sheet according to the second aspect of the present invention can provide the space appropriate in size among fibers for each nonwoven fabric, since each fiber diameter of the fibers that constitute the meltblown nonwoven fabric of the layer M and the fibers that constitute the spunbonded nonwoven fabric of the layer S is not too small, i.e., 0.5 µm or larger. Therefore, extraction filters formed with such an extraction sheet have good extraction performance, since the extraction filters are hardly clogged, but make water or hot water permeate easily.

(c) Third Aspect of the Present Invention

According to the third aspect of the present invention, in addition to the advantages described in (a) or (b) above, the following particular effects can be achieved. That is, since the resin forming the meltblown nonwoven fabric of the layer M for the extraction sheet according to the third aspect of the present invention has a softening point of 60 to 120° C., the extraction bag manufactured of such an extraction sheet, even when immersed in boiled water in use, does not cause its sealing part to peel off, or significantly deform.

The term "softening point" as used herein refers to the temperature at which resin in solid form softens and begins deforming.

In addition, the softening point of the resin forming the meltblown nonwoven fabric of the layer M is adjusted to be at least 30° C. lower than that of the resin forming the spunbonded nonwoven fabric of the layer S. A large difference is provided in softening point between the two resins forming the individual nonwoven fabrics. Therefore, in the manufacture of such an extraction sheet, the above-described resin forming the meltblown nonwoven fabric can be well molten at a lower temperature than the softening point of the above-described resin forming the spunbonded nonwoven fabric. Therefore, even when the layer M is formed by blowing a fibrous molten resin at a high temperature onto a surface of the spunbonded nonwoven fabric of the layer S by a melt-blown process, for example, the meltblown nonwoven fabric of the layer M can be lamination-formed on the surface of the spunbonded nonwoven fabric of the layer S without softening or deforming the spunbonded nonwoven fabric of the layer S.

In addition, in the manufacture of the extraction filters using such an extraction sheet, for example, when sealed by surface-welding or linear-welding the two extraction sheets at a required location with their layers M placed opposite to each other, the meltblown nonwoven fabric of the layer M having a low softening point can be well molten to act as an adhesive material, while the spunbonded nonwoven fabric of the layer S having a high softening point can be prevented from softening to retain the morphology of the extraction sheet. This can provide the extraction filters having a high sealing strength.

In particular, since the difference in softening point between the above-described meltblown nonwoven fabric and the above-described spunbonded nonwoven fabric is as large as at least 30° C., the meltblown nonwoven fabric can be heated at a considerably higher temperature than its softening point, and thus softened in a very short time in the sealing. This can shorten the sealing time, and thus the manufacturing time of the extraction filters, thereby enhancing manufacturing efficiency.

In addition, the above-described meltblown nonwoven fabric can be molten at a high temperature to allow the resin to sufficiently fluidize, and allow the resultant molten resin to be impregnated deeply into the space among the fibers of the above-described spunbonded nonwoven fabric, for example, by a clamping force generated in heat-sealing bars. This can bring about what is called the "anchoring effect", and thus provide extraction filters having a high sealing strength.

Furthermore, the resin forming the meltblown nonwoven fabric of the layer M is a polylactic acid-based resin that has a low crystallinity of 9.0% or lower and therefore, in general, often has also a low softening point of about 60 to 120° C. However, in order to further ensure that the softening point falls within such a range of temperatures and, in addition, is at least 30° C. lower than the softening point of the resin forming the spunbonded nonwoven fabric of the layer S, the temperature of heating of a polylactic acid-based resin as the raw material to be molten or the temperature of a stream of air blown at the fibrous molten resin may be appropriately adjusted in the spinning of constituent fibers of the above-described meltblown nonwoven fabric. In addition, the softening point can be adjusted by appropriately combining the resin with a raw resin having a different molecular weight or adding various types of additives.

In addition, the resin forming the spunbonded nonwoven fabric of the layer S is the polylactic acid-based resin that has a rather high crystallinity of 30.0 to 60.0% and therefore, in general, often has also a high softening point of about 130 to 170° C. However, in order to further ensure that the softening point falls within such a range of temperatures, the spinning speed may be appropriately adjusted in the spinning of constituent fibers of the above-described spunbonded nonwoven fabric. In addition, the softening point can be adjusted by appropriately combining the resin with a raw resin having a different molecular weight or adding various types of additives.

(d) Fourth Aspect of the Present Invention

The extraction filter according to the fourth aspect of the present invention is formed by employing the extraction sheet according to any one of the above-described first to third aspects of the present invention and sealing by welding the extraction sheet at a predetermined location with the layer M placed inside. Thus, in the manufacture of such an extraction filter, the layer M of the extraction sheet having a low softening point is heated and molten to act as an adhesive material, thereby providing a sealing part with a high sealing strength. Therefore, the extraction filter hardly breaks.

In addition, the creasable layer M is placed inside the extraction filter, whereby any unwanted crease lines or wrinkles can be hardly visible from the outside of the extraction filter, which can provide beautiful and attractive products.

Furthermore, the crease line is easily formed in the extraction filter according to the present invention, which can easily arrange a desired three-dimensional shape by the crease line appropriately formed in the extraction filter in use. For example, a powder coffee extraction filter that is set and used in a funnel-shaped dripper has generally a substantially inverted triangular or substantially inverted trapezoidal shape having an upper edge formed in an arc-shaped curve. In use, the extraction filter is made in a mortar shape with the upper edge open, and then the powder coffee is placed into the filter. At the opening of the upper edge, the crease line is formed in the extraction filter, which can easily arrange the mortar shape with the upper edge widely open so as to fit with an inside surface of the wall of the funnel-shaped dripper. Thus, the extraction filter has high handling property.

(e) Fifth Aspect of the Present Invention

The extraction bag according to the fifth aspect of the present invention includes the extraction material filled into the bag body formed by employing the extraction sheet according to any one of the above-described first to third aspects of the present invention and sealing by welding the extraction sheet at a predetermined location with the layer M placed inside. Similarly to the extraction filter according to the above-described fourth aspect of the present invention, the extraction bag is provided with a sealing part having high sealing strength and thus hardly breaks.

In addition, since the creasable layer M is placed inside the extraction bag, any crease lines or wrinkles can be hardly visible from the outside of the extraction bag, which can provide beautiful and attractive products.

In addition, in the manufacture of the extraction bag according to the present invention in the form of a pillow, the crease line can be appropriately formed, thereby providing the extraction bag having improved shape retention. Thus, the extraction bags, even when stacked, can be steady and hardly slip down. Therefore, such extraction bags in stack can be conveyed or housed in an external container and thus, have high handling property.

BRIEF DESCRIPTION OF DRAWINGS

FIG. 1 is a perspective view illustrating one embodiment of an extraction filter according to the present invention.

FIG. 2 is a perspective view illustrating one embodiment of an extraction bag according to the present invention.

FIG. 3 is a perspective view illustrating another embodiment of an extraction bag according to the present invention.

FIG. 4 is a side view illustrating five stacked extraction bags shown in FIG. 3.

DESCRIPTION OF EMBODIMENTS

Next, embodiments of the present invention will be described. The present invention is not limited to these embodiments.

An extraction sheet according to the present invention is suitable as a material for an extraction filter used by placing an extraction material thereinto and pouring hot water or water from above to seep it, like a powder coffee extraction filter that is used by being set in a funnel-shaped dripper. The extraction sheet of the present invention is also suitable as a material for an extraction bag that is a bag body filled with an extraction material, like a tea bag, and that is used by being immersed in hot water or water.

The extraction material as used herein broadly includes beverage materials or food materials, drugs and quasi drugs that contain components to be extracted in hot water, water or alcohols. Examples include tea leaves such as green tea, black tea, roasted green tea, oolong tea, and du zhong tea, barley tea, flowering tea, coffee powder, dried bonito shaving and dried mackerel shaving, kelp for soup, boiled-dried sardine, Kampo products and bath salts.

The extraction sheet according to the present invention is formed by laminating a layer M formed from a meltblown nonwoven fabric and a layer S formed from a spunbonded nonwoven fabric, each of these nonwoven fabrics being composed of fibers of a polylactic acid-based resin.

As used herein, the polylactic acid-based resin can employ a polymer of L-lactic acid or D-lactic acid and a copolymer of L-lactic acid and D-lactic acid, and in addition a copolymer of L-lactic acid, D-lactic acid and hydroxycarboxylic acid, and a mixture in arbitrary ratio of these polymers.

Furthermore, other commonly ingredients may be added to the polylactic acid-based resin used in the present invention as long as the advantages of the present invention are not impaired. Examples include appropriately impact modifiers such as various elastomers, crystal nucleating agents, coloring inhibitors, delustrants, antioxidants, heat resistant agents, plasticizers, lubricants, weather-proofing agents, colorants, or pigments.

In addition, the morphology of fibers of the individual nonwoven fabrics constituting the layer M and the layer S according to the present invention may be monofilament fibers, multifilament fibers, or conjugated fibers having a core-sheath structure in which two types of resins are combined. Furthermore, the cross-sectional shape of these fibers is not always round, but may be uneven shapes such as elliptical, triangular, and other polygonal shapes, and even hollow shapes.

In general, the reason why a sheet comprising many fibers such as nonwoven fabric and paper is creasable seems to be that when the sheet is folded, the positions of many fibers present in the crease line part are varied, and the fibers are tangled or caught with one another in the varied situation, and thus each fiber does not return to the original position. Thus, typically when fibers constituting the sheet are fine and the basis weight is large (in other words, the space among fibers is small), when the fibers bond together at many bonding parts, and when the range of the position variation of the fibers at the time of folding the sheet is thus limited to a certain extent, the sheet seems to be creasable.

From such a point of view, the meltblown nonwoven fabric of the layer M according to the present invention is a creasable nonwoven fabric since the meltblown nonwoven fabric has the following characteristics: it is formed from fibers of the polylactic acid-based resin, has a relatively large basis weight of 2.0 to 30.0 g/m$^2$, and in addition, has many bonding parts where the fibers bond together because of the fibers being spun and accumulatively solidified with a molten resin at a high temperature so as to have a crystallinity of 9.0% or lower.

The meltblown nonwoven fabric as used herein refers to a nonwoven fabric formed by what is called the "melt-blown process". The melt-blown process is typically a manufacture process that includes heating and melting a raw resin, extruding the raw resin through spinning nozzles, blowing a stream of hot air at the extruded resin to make it fibrous while scattering the fibrous resin, and blowing, accumulating, and solidifying the scattered resin onto the surface of a collector such as a conveyor or other nonwoven fabrics.

In addition, the meltblown nonwoven fabric typically has a characteristic of fibers bonding together at many points because the nonwoven fabric is manufactured by accumulating the fibrous heat-molten resin prior to the complete solidification.

In particular, the meltblown nonwoven fabric of the layer M according to the present invention is manufactured by heating and melting the raw resin at a high temperature sufficiently to leave as few crystallized moieties as possible in the resin, extruding the molten resin through the spinning nozzles, blowing the stream of hot air at the extruded resin to make it fibrous while scattering the fibrous resin, and accumulating and solidifying the scattered resin while the fiber surface remains softened. Thus, the resin of the meltblown nonwoven fabric has a crystallinity of 9.0% or lower to reduce the fiber elasticity. In addition, the meltblown nonwoven fabric has many bonding parts where the fibers firmly bond together.

Furthermore, the crystallinity of the resin forming the meltblown nonwoven fabric is more preferably 7.5% or lower. In contrast, with the crystallinity beyond 9.0%, the meltblown nonwoven fabric has higher fiber elasticity and becomes hardly creasable, which is not preferred.

The term "crystallinity" as used herein refers to, when the resin is partially crystallized, a ratio of the crystallized moieties with respect to the entire resin, and lower crystallinity generally tends to decrease the softening point.

In addition, the fibers constituting the meltblown nonwoven fabric of the layer M have a fiber diameter of 15.0 μm or smaller. If the fiber diameter is reduced to 15.0 μm or smaller, the number of the fibers of the nonwoven fabric per unit area can be increased. Thus, the meltblown nonwoven fabric becomes creasable by making the space among the fibers smaller and increasing the number of the bonding parts where the fibers bond together.

Moreover, such a meltblown nonwoven fabric preferably has a fiber diameter of 0.5 μm or larger. The meltblown nonwoven fabric having a fiber diameter as large as at least 0.5 μm can make the space among fibers not extremely small but moderately large. Therefore, the extraction filters or the extraction bags formed with such a meltblown nonwoven fabric can be hardly clogged, and have good extraction performance to the beverages.

Furthermore, the "fiber diameter" refers to the thickness of the fibers constituting the nonwoven fabric, and in the case of the cross-sectional shape of the fibers being round, refers to the diameter of the fibers, and in the case of the cross-sectional shape of the fibers being other than round, refers to the diameter obtained by virtually converting the cross-sectional shape to the round shape while maintaining its dimension.

In addition, the above-described meltblown nonwoven fabric has a basis weight of 2.0 to 30.0 g/m$^2$, more preferably 3.0 to 30.0 g/m$^2$. If the basis weight is 2.0 g/m$^2$ or larger, the number of the fibers of the nonwoven fabric per unit area can be increased. Thus, the meltblown nonwoven fabric becomes creasable by making the space among the fibers smaller and increasing the number of the bonding parts where the fibers bond together.

On the other hand, if the basis weight is 30.0 g/m$^2$ or smaller, the thickness of the nonwoven fabric can be reduced. Thus, the extraction sheet can make water or hot water permeate easily and improve its extraction performance to the beverages, and further enhance its transparency.

Furthermore, the layer M of the above-described extraction sheet, which is formed of the above-described meltblown nonwoven fabric, may be mixed with, aside from such a meltblown nonwoven fabric, nonwoven fabrics manufactured by other spinning methods and other materials as long as that will not impair advantages of the present invention. The mixing ratio of other nonwoven fabrics is preferably not more than about 10% relative to the above-described meltblown nonwoven fabric.

Next, the layer S in the extraction sheet according to the present invention is formed of the spunbonded nonwoven fabric.

The spunbonded nonwoven fabrics is a nonwoven fabric comprising relatively long fibers formed by what is called the "spunbond process". The spunbond process is a manufacture process, in general, that includes heating and melting a raw resin, extruding the raw resin through spinning nozzles, pulling and drawing the extruded resin by blowing air at this extruded resin at a high speed while cooling it to form fibers, accumulating the fibers onto the collector such as the conveyor to form a web, and then subjecting the resultant web to adjustment of the web thickness or partial thermocompression bonding treatment, if necessary, using heated or unheated flat rolls or embossing rolls.

Furthermore, in the partial thermocompression bonding treatment, the above-described web may be passed, for example, between a pair of rolls composed of an embossing roll having an uneven surface structure and a flat roll having a flat surface, to form thermocompression bonding parts evenly dispersed over the entire spunbonded nonwoven fabric. Furthermore, an area ratio of the thermocompression bonding parts (thermocompression bonding area ratio) is preferably 5.0 to 30.0% relative to the total area of the surface of the nonwoven fabric, and in addition, the softening of the resin in the partial thermocompression bonding treatment can be carried out by any means such as heating with a heater or vibration by ultrasound.

By drawing its constituent fibers during the spinning, the spunbonded nonwoven fabric of the layer S can increase the crystallinity of the resin to 30.0 to 60.0%, and increase tensile strength and softening point. Thus, for adjusting the crystallinity of the resin to 30.0 to 60.0%, for example, the fibers may be spun at a high spinning speed of about 2500 to 6000 m/min while drawing sufficiently.

In addition, if conditions are thus arranged, such as drawing of the fibers at a high speed, then the crystallite size of the resin can be as large as about 8 to 15 nm, and therefore the spunbonded nonwoven fabric can have improved heat stability, such as being hardly shrinkable in a high-temperature environment, which is preferred.

It is typically difficult to manufacture the spunbonded nonwoven fabric having a crystallinity over 60.0% by the above-described manufacture process.

Furthermore, the above-described spunbonded nonwoven fabric has a fiber diameter of 35.0 μm or smaller. The spunbonded nonwoven fabric having a fiber diameter over 35.0 μm has higher fiber elasticity, and produces the action that eliminates the crease line against a bending force generated by the crease line formed in the meltblown nonwoven fabric of the layer M, which is not preferred.

Furthermore, such a spunbonded nonwoven fabric preferably has a fiber diameter of 0.5 μm or larger. The spunbonded nonwoven fabric having a fiber diameter as large as at least 0.5 μm can make the space among fibers not extremely small but moderately large. Therefore, the extraction filters or the extraction bags formed with such a spunbonded nonwoven fabric can be hardly clogged, and have good extraction performance to the beverages.

In addition, the above-described spunbonded nonwoven fabric has a basis weight of 5.0 to 30.0 g/m², more preferably 7.0 to 25.0 g/m². If the basis weight is 5.0 g/m² or larger, the number of the fibers of the nonwoven fabric per unit area can be increased. Thus, the spunbonded nonwoven fabric can have an increased tensile strength.

Furthermore, if the basis weight is 30.0 g/m² or smaller, the thickness of the nonwoven fabric can be reduced. Thus, the extraction sheet can make water or hot water permeate easily and improve its extraction performance, and further enhance its transparency. On the other hand, the spunbonded nonwoven fabric having a basis weight over 30.0 g/m² becomes thick, has higher elasticity, and produces the action that eliminates the crease line against the bending force generated by the crease line formed in the meltblown nonwoven of the layer M, which is not preferred.

Furthermore, the layer S of the above-described extraction sheet, which is formed of the above-described spunbonded nonwoven fabric, may be mixed with, aside from such a spunbonded nonwoven fabric, nonwoven fabrics manufactured by other spinning methods and other materials as long as that will not impair advantages of the present invention. The mixing ratio of other nonwoven fabrics is preferably not higher than about 10% relative to the spunbonded nonwoven fabric.

Next, a process of laminating the layer M and the layer S of the above-described extraction sheets will be described.

First, the layer S comprising the spunbonded nonwoven fabric is formed by the spunbond process. This spunbonded nonwoven fabric may be formed by just accumulating spun fibers so as to form a web-shaped fabric, or by passing the web through heated embossing rolls or the like to carry out the partial thermocompression bonding treatment.

Next, the layer M comprising the meltblown nonwoven fabric can be formed on the surface of this layer S by the melt-blown process, by blowing a high-temperature fibrous molten resin thereonto and accumulating and solidifying the same.

Then, if the softening point of the resin forming the above-described meltblown nonwoven fabric is adjusted to be at least 30° C., more preferably at least 40° C. lower than that of the resin forming the above-described spunbonded nonwoven fabric, the resin of the above-described meltblown nonwoven fabric can be molten at such a high temperature that the resin of the above-described spunbonded nonwoven fabric is not softened. Therefore, even when the high-temperature fibrous molten resin is blown onto the surface of the above-described spunbonded nonwoven fabric by the melt-blown process, the above-described meltblown nonwoven fabric can be formed on and bond onto the surface without deforming the spunbonded nonwoven fabric.

In addition, such a laminating process impregnates the fibers of the meltblown nonwoven fabric into the space among the fibers of the spunbonded nonwoven fabric and solidifies the fibers to bring about what is called the anchoring effect, and thus these two nonwoven fabrics can bond firmly, which is preferred.

If necessary, such a laminated sheet may be applied with a pressing force by the flat rolls onto the whole surface thereof to adjust its thickness, or may be subjected to the partial thermocompression bonding treatment by the embossing rolls.

Furthermore, the process of forming the above-described spunbonded nonwoven fabric and the process of forming the above-described meltblown nonwoven fabric can be carried out continuously, so called in-line, to enhance manufacturing efficiency, which is preferred.

In addition, as to another process of laminating the layer M and the layer S, the spunbonded nonwoven fabric and the meltblown nonwoven fabric may be overlaid, which are separately manufactured, and subject the overlaid nonwoven fabrics to the partial thermocompression bonding treatment using the embossing rolls to integrate both of the nonwoven fabrics into a unitary sheet.

The extraction sheet according to the present invention may be an extraction sheet including three or more layers formed by further laminating any other nonwoven fabric or woven fabric as long as that will not impair advantages of the present invention.

The extraction sheet according to the present invention has a bending hysteresis of $5.0 \times 10^{-3}$ to $14.5 \times 10^{-3}$ gf·cm/cm.

The extraction sheet having a bending hysteresis of $5.0 \times 10^{-3}$ gf·cm/cm or larger is creasable. For example, in the manufacture of the extraction filters, when the elongated extraction sheet is fed at a high speed on the manufacturing line, the extraction sheet can be folded in half or otherwise bent to form the crease line along the conveyance direction by the guide members placed on the manufacturing line, and thus be in a straight condition. Consequently, the extraction sheet can be prevented from meandering in the crosswise direction, which prevents defective products of extraction filters, and enhances manufacturing efficiency.

In addition, the extraction sheet having a bending hysteresis of $14.5 \times 10^{-3}$ gf·cm/cm or smaller can be creasable but nevertheless hardly in the "wrinkled" condition where many unwanted creases or wrinkles are formed, and thus provide the products having improved appearance.

For the extraction sheet according to the present invention, the resin forming the meltblown nonwoven fabric of the layer M has a softening point of 60 to 120° C., in which the softening point is preferably at least 30° C., more preferably at least 40° C. lower than that of the resin forming the spunbonded nonwoven fabric of the layer S.

If the resin forming the above-described meltblown nonwoven fabric has a softening point of 60 to 120° C., the extraction bag manufactured with such an extraction sheet does not cause its heat-sealing part to be pulled apart, or significantly deform even when the extraction bag is immersed in hot water in use.

In addition, if the softening point of the resin forming the above-described meltblown nonwoven fabric is at least 30° C. lower than that of the resin forming the above-described spunbonded nonwoven fabric, the spunbonded nonwoven fabric is not deformed and the extraction sheet can retain its shape even when a high-temperature fibrous molten resin is blown on the surface of the above-described spunbonded nonwoven fabric by the melt-blown process in the manufacture of the extraction sheet as described above.

Furthermore, in the manufacture of the extraction filters with the above-described extraction sheet, for example, when the two extraction sheets are sealed by surface-welding or linear-welding at a predetermined location with their layers M placed opposite to each other, the meltblown nonwoven fabric of the layer M having a low softening point can be well molten to act as an adhesive material, while the spunbonded nonwoven fabric of the layer S having a high softening point can be prevented from softening, which retains the morphology of the extraction sheet.

Particularly, when the difference in the softening points between the above-described meltblown nonwoven fabric and the above-described spunbonded nonwoven fabric is as large as at least 30° C., more preferably at least 40° C., the meltblown nonwoven fabric can be molten in an extremely short time since it can be heated at a considerably higher temperature than its softening point in the sealing process. Consequently, the duration of the sealing process can be shortened, and eventually the manufacturing time of the extraction filters can be shortened, which can enhance the manufacturing efficiency.

In addition, the above-described meltblown nonwoven fabric can be molten at a high temperature to allow the resin to sufficiently fluidize, and allow the resultant molten resin to be impregnated deeply into the space among the fibers of the above-described spunbonded nonwoven fabric, for example, by a clamping force generated by the sealing bar. This can bring about the anchoring effect and provide the extraction filters having a high sealing strength.

Known sealing processes such as welding with the heat-sealing bar or welding with the ultrasonic vibration can be widely applied to the extraction sheet according to the present invention. In addition, the extraction sheet according to the present invention can obtain a high sealing strength in a short time, and thus have excellent machinability, in particular to high-speed manufacturing equipment for the extraction filters.

Here, the resin forming the above-described meltblown nonwoven fabric is a polylactic acid-based resin that has a low crystallinity of 9.0% or lower and therefore, in general, often has also a low softening point of about 60 to 120° C. However, for further ensuring that the softening point falls within such a range of the temperatures and, in addition, is at least 30° C. lower than the softening point of the resin forming the spunbonded nonwoven fabric of the layer S, the temperature of heating of the polylactic acid-based resin as the raw material to be molten or the temperature of a stream of air blown at the fibrous molten resin may be appropriately adjusted in the spinning of constituent fibers of the above-described meltblown nonwoven fabric. In addition, the softening point can be adjusted by appropriately combining the resin with a raw resin having a different molecular weight or adding various types of additives.

In addition, the resin forming the above-described spunbonded nonwoven fabric is a polylactic acid-based resin that has a high crystallinity of 30.0 to 60.0% and therefore, in general, often has also a high softening point of about 130 to 170° C. However, for further ensuring that the softening point falls within such a range of the temperatures, the spinning speed may be appropriately adjusted in the spinning of constituent fibers of the above-described spunbonded nonwoven fabric. In addition, the softening point can be adjusted by appropriately combining the resin with a raw resin having a different molecular weight or adding various types of additives.

Next, an embodiment of the extraction filter manufactured with the extraction sheet according to the present invention will be described with reference to FIG. 1.

An extraction filter 1 is a drip coffee filter that is set and used in a funnel-shaped dripper (not illustrated). A surface-welded section 3 is provided at the base and the side of a substantially inverted trapezoidal filter section 2 with the layer M of the above-described extraction sheet placed inside. In use, the filter arranges the mortar shape with an upper edge 4 open, ground coffee is put through the open upper edge 4, and hot water is poured from above and seeped to extract the coffee beverage.

Such an extraction filter 1 can arrange and retain the shape with the upper edge 4 wide open as illustrated in FIG. 1, by appropriately forming a crease line 5 before use, since the filter section 2 is formed of the above-described creasable extraction filter.

To manufacture the extraction filter 1, the above-described continuous elongated extraction sheet, for example, may be used as an original fabric, and cut and surface-welded into a predetermined shape by a known forming machine.

The surface-welding can be carried out by compressing and heating the location to be welded of the extraction sheet by the heat-sealing bar, and melting only the meltblown nonwoven fabric of the layer M having a low softening point to function as an adhesive material, without softening the spunbonded nonwoven fabric of the layer S having a high softening point. Other welding processes can employ welding by ultrasonic vibration, and fusion sealing in which cutting and welding the extraction sheet are simultaneously carried out.

The extraction filter 1 thus manufactured is a beautiful and attractive product since the layer M of the above-described creasable extraction sheet is placed inside, whereby any crease lines or wrinkles can be hardly visible from the outside.

In addition, the shape of the extraction filter 1 is not limited to the substantially inverted trapezoidal shape as illustrated in FIG. 1, but can be any shape such as substantially inverted triangular or disk shape. In addition, its size and use method are not limited.

Next, an embodiment of the extraction bag manufactured with the extraction sheet according to the present invention will be described with reference to FIG. 2.

The extraction bag 6 is a product generally referred to as a tea bag, and includes a bag body 7 formed of the above-described extraction sheet into a tetrahedral shape, a tag 9 for picking up the extraction bag 6 with one's fingertips in use, and a string 8 having one end stuck to the top end of the bag body 7 and the other end stuck to the tag 9. The bag body 7 is formed in a bag shape with the layer M of the above-described extraction sheet placed inside, and formed with a linear-welded section 10 at the edge of each side by ultrasonic vibration, and is filled with dried black tea leaves as the extraction material (not illustrated).

When the extraction bag 6 is used, for example, the tag 9 is held with one's fingertips, the bag body 7 is immersed in a cup containing hot water for several seconds to several minutes, and dried tea leaves in the bag body 7 are reconstituted in hot water to elute black tea components.

The process for forming the bag body 7 includes, for example, preparing the above-described continuous and elongated extraction sheet as an original fabric, cutting and linear-welding the sheet, and thus forming the bag body 7 while filling it with dried tea leaves and sealing by a known forming filling machine. Then, the linear-welding of the bag body 7 can be carried out by giving vibration to the location to be welded of the extraction sheet with ultrasound to rise in the temperature thereof, and melting only the meltblown nonwoven fabric of the layer M having a low softening point to function as an adhesive material, without softening the spunbonded nonwoven fabric of the layer S having a high softening point.

In addition, other welding processes can employ the surface-welding by clamping with the heat-sealing bar, and fusion sealing in which the cutting and the welding of the extraction sheet are simultaneously carried out.

The bag body 7 thus formed is a beautiful and attractive product since the layer M of the above-described creasable extraction sheet is placed inside, whereby any crease lines or wrinkles can be hardly visible from the outside.

In addition, the shape of the bag body 7 is not limited to the tetra shape as illustrated in FIG. 2, but can be any shape such as pillow, pyramid, disk, or stick shape.

Moreover, its size, capacity, and use method are not limited. Furthermore, the string 8 and the tag 9 may be temporarily stuck to the surface of the bag body 7 with such strength that they can be easily peeled off therefrom in use.

Preferably, the extraction bags 6 after manufactured are packaged one by one or in groups in external bags or external containers (not illustrated) made of resin film, paper and the like in order to retain the flavor of dried tea leaves in the bag body 7 and prevent fouling.

In addition, in the bag body 7, the edge of each side of the tetrahedral shape is heat-sealed linearly to form the linear-welded section 10, and thus a crease line 11 is substantially formed at the boundary sections between this linear-welded section 10 and the above-described un-welded extraction sheet. Consequently, since the extraction sheet forming the bag body 7 produces an action for retaining its straight condition, the bag body 7 retains its beautiful tetrahedral shape.

Next, another embodiment of the extraction bag will be described with reference to FIG. 3.

A bag body 13 in the form of a pillow of an extraction bag 12 is made bag-shaped by placing the layer M of the above-described extraction sheet inside, and provided with surface-welded sections 14 at the individual edges in three sides of four sides of the rectangle by heat-sealing, and is filled with roasted barley for barley tea as an extraction material (not illustrated).

Such an extraction bag 12 can be used by being immersed in hot water, and boiled for a few minutes to decoct the barley tea component.

To form the bag body 13, for example, the above-described continuous elongated extraction sheet can be used as an original fabric, cut and surface-welded by a known forming filling machine, and formed into the bag body 13 while filling and sealing the roasted barley. The surface-welding of the bag body 13 can be carried out by compressing and heating the location to be welded of the extraction sheet with the heat-sealing bar, and melting only the meltblown nonwoven fabric of the layer M having a low softening point to function as an adhesive material, without softening the spunbonded nonwoven fabric of the layer S having a high softening point.

The bag body 13 thus formed is a beautiful and attractive product since the layer M of the above-described creasable extraction sheet is placed inside, whereby any crease lines or wrinkles are hardly visible from the outside.

Preferably, the extraction bags 12, after manufactured are packaged one by one or in groups in the external bags or the external containers (not illustrated) made of resin film, paper or the like in order to retain the flavor of the roasted barley in the bag body 13 and prevent fouling.

In addition, in the bag body 13 of the extraction bag 12, the individual edges in three sides of four sides of the rectangle are heat-sealed linearly to form the surface-welded sections 14, and thus crease lines 15 are substantially formed at the boundary sections between these surface-welded sections 14 and the above-described un-welded extraction sheet. Consequently, the extraction sheet forming the bag body 13 produces the action that retains its straight condition, and the bag body 13 has improved shape retention and hardly deforms. Therefore, the bias in distribution of the roasted barley within the bag body 13 can be reduced, thereby retaining the bag body 13 in a relatively flat shape. As illustrated in FIG. 4, the extraction bags 12, even when stacked, have steady morphology, and hardly slip down. Thus, the extraction bags can be conveyed in as-stacked condition or be housed together in one external container or the like and have high handling property.

EXAMPLES

The present invention will now be described in detail with reference to Examples, but the present invention should not be limited to these Examples.

First, test methods for individual indexes according to the present invention will be described.

(1) Crystallinity (%)

Test pieces were sampled from the nonwoven fabric to be tested. Each of the test pieces was placed in a differential scanning calorimeter (from TA INSTRUMENTS, Product No. 2920MDSC V2.6A) configured to increase a temperature at a rising rate of 10° C./min. ranging from 30° C. up to 240° C. to measure crystallization heat ΔHc and crystalline melting heat ΔHm. Crystallinity was calculated according to the following formula. In the formula, the numerical value "93" represents perfect crystal melting heat of polylactic acid (in J/g).

$$\text{Crystallinity (\%)} = (\Delta Hm - \Delta Hc)/93 \times 100$$

(2) Softening Point (° C.)

Test pieces were sampled from the nonwoven fabric to be tested. Each of the test pieces was mounted on a temperature programming section of a melting point measurement apparatus (from AS ONE Co. Ltd., Product No. ATM-02), and pressed with a metal spatula while gradually increasing the temperature from ordinary temperature. The temperature at which softening of the test piece was observed by visual observation represented the softening point.

(3) Fiber Diameter (μm)

The diameters were measured at 10 locations for fibers of the nonwoven fabric to be tested by visual inspection using an optical microscope. A mean value of the diameters was obtained.

(4) Basis Weight (g/m$^2$)

Test pieces having a size of 10 cm square were sampled from the nonwoven fabric to be tested in accordance with JIS L-1906, and then the masses of the test pieces were measured to calculate the basis weights.

(5) Bending Hysteresis (gf·Cm/Cm)

Test pieces having a size of 20 cm square were prepared from the extraction sheet to be tested, and each of the test pieces was placed in a pure bending tester (Type KES-FB2) to measure bending hysteresis in accordance with KES method (KES-F2 system) of The Textile Machinery Society of Japan, ed. "The Texture Measurement and Standardization Study Committee".

(6) Tensile Strength (N/15 mm)

Along the longitudinal direction of an elongated extraction sheet continuously manufactured (the flow direction in the manufacture), test pieces with a length of 150 mm and a width of 15 mm were prepared. Each of the test pieces was pulled at a speed of 100/min by a Little Senstar manufactured by JT Tohsi Inc. to measure the tensile strength.

Example 1: Extraction Sheet

A polylactic acid molten resin (L-form-containing ratio 98%) at 220° C. was extruded through the spinning nozzles to make it fibrous, the fibrous resin was drawn at a spinning speed of 3,000 m/min. by an ejector while cooling to form long fibers, and the long fibers were accumulated onto a conveyor belt moving at a fixed speed to form the spunbonded nonwoven fabric (the layer S).

Next, a polylactic acid molten resin (L-form-containing ratio 98%) at 250° C. was extruded through the spinning nozzles to make it fibrous, the fibrous resin was blown by a stream of air heated to 295° C. and scattered, and the scattered resin was blown onto the surface of the above-described spunbonded nonwoven fabric that moves at a fixed speed, and then was accumulated and solidified, so that the meltblown nonwoven fabric (the layer M) is formed. In addition, both the above-described nonwoven fabrics were bonded together, and were passed through the nip between the flat rolls to manufacture an elongated extraction sheet whose thickness is adjusted to 0.075 mm.

The obtained elongated extraction sheet was thin, firm, and creasable, and had a bending hysteresis of $9.5 \times 10^{-3}$ gf·cm/cm and a tensile strength of 12.5 N/15 mm. In addition, the meltblown nonwoven fabric of this extraction sheet had a basis weight of 6.0 g/m$^2$, and the fibers constituting the meltblown nonwoven fabric had a crystallinity of 3.0%, a softening point of 65° C., and a fiber diameter of 10.5 μm. Furthermore, the spunbonded nonwoven fabric of this extraction sheet had a basis weight of 12.0 g/m$^2$, and the fibers constituting the spunbonded nonwoven fabric had a crystallinity of 36.2%, a softening point of 160° C., and a fiber diameter of 20.3 μm.

Example 2: Extraction Bag as Illustrated in FIG. 2

The elongated extraction sheet as prepared in Example 1 was placed in the forming filling machine, linear-welded at a predetermined location by ultrasonic vibration, and formed into the tetrahedral bag body 7 while filling with dried tea leaves of black tea (CTC manufacturing process) to manufacture the extraction bag 6. In this case, the above-described meltblown nonwoven fabric (the layer M) was molten in an extremely short time by the temperature rising effects of the ultrasonic vibration, while the above-described spunbonded nonwoven fabric (the layer S) was not softened and retained its morphology.

The manufactured extraction bag 6 included the bag body 7 filled with 2 g of dried tea leaves and having a tetrahedral shape that has a length of each side of 55 mm with a linear-welded section 10 formed at the edge of each side. The extraction bag 6 had no apparently noticeable crease lines or wrinkles, and thus was a beautiful and attractive extraction bag.

In the manufacturing process of such an extraction bag 6, the above-described elongated extraction sheet had crease lines formed along the conveyance direction by the guide member provided in the forming filling machine. Although such an extraction sheet was fed and conveyed at a high speed, meandering problems or the like did not occur.

Furthermore, when the obtained extraction bag 6 was immersed in hot water at about 95° C. for one minute while shaking up and down about 10 times to make black tea, the reconstitution of dried tea leaves by hot water was quick, allowing suitably strong black tea to be extracted in a short time. In addition, the linear-welded section 10 of the bag body 7 had no problems of peeling off or hardly caused powder leakage.

Example 3: Extraction Bag as Illustrated in FIG. 3

The elongated extraction sheet according to Example 1 was placed in the forming filling machine, surface-welded at a predetermined location sandwiched by the heat-sealing bars, and formed into the rectangular bag body 13 while filling with roasted barley for barley tea to manufacture the extraction bag 12. In this case, the above-described meltblown nonwoven fabric (the layer M) was molten in an extremely short time by clamping and heating with the heat-sealing bars, while the above-described spunbonded nonwoven fabric (the layer S) was not softened but retained its morphology.

The manufactured extraction bag 12 included the bag body 13 in a rectangular shape of 80 mm×100 mm with the surface-welded section 14 having a width of 10 mm formed at the individual edges of three sides of the four sides in total, the bag body being filled with 20 g of the roasted barley. The extraction bag 12 had no apparently noticeable crease lines or wrinkles, and thus was a beautiful and attractive extraction bag.

In the manufacturing process of the extraction bag 12, the above-described elongated extraction sheet had crease lines formed by folding in half along the conveyance direction by the guide member provided in the forming filling machine. Although such an extraction sheet was fed and conveyed at a high speed, the meandering problems or the like did not occur.

In addition, the five obtained extraction bags 12 stacked could be conveyed in a steady condition on the conveyor belt as illustrated in FIG. 4, without slipping down.

Furthermore, the obtained extraction bag 12 was immersed in hot water at about 100° C., and boiled for five minutes to make barley tea, allowing suitably strong barley tea to be extracted. The surface-welded section 14 of the bag body 13 had no problems of peeling off or hardly caused powder leakage.

Test Examples

Samples of 19 extraction sheets a to s as listed in Table 1 each were manufactured by the following processes, and the obtained samples were measured for "bending hysteresis" and "tensile strength". In addition, "creasability" was evaluated by visual observation for the remaining state of the crease line after manually folding in half each sample of the extraction sheets, lightly clamping the sample, and quickly releasing the clamping. Results are presented in Table 1.

Sample a: An equivalent was manufactured by the same process as the above-described extraction sheet of Example 1.

Samples b to f: Five samples b to f were manufactured as in Example 1 except that the heating temperature at which a polylactic acid resin as a raw material was molten and the temperature of a stream of air which was blown at the molten resin extruded through spinning nozzles were changed appropriately in forming the meltblown nonwoven fabric of the layer M in the process of manufacturing the extraction sheet of Example 1.

Samples g to i: Three samples g to i were manufactured as in Example 1 except that the spinning speed by the ejector was changed appropriately in forming the spunbonded nonwoven fabric of the layer S in the process of manufacturing the extraction sheet of Example 1.

Samples j to m: Four samples j to m were manufactured as in Example 1 except that the moving speed of the spunbonded nonwoven fabric of the layer S was changed appropriately in forming the meltblown nonwoven fabric of the layer M in the process of manufacturing the extraction sheet of Example 1.

Samples n to s: Six samples n to s were manufactured as in Example 1 except that the moving speed of the conveyor belt in forming the spunbonded nonwoven fabric of the layer S and the moving speed of the spunbonded nonwoven fabric of the layer S in forming the meltblown nonwoven fabric of the layer M were changed appropriately in the process of manufacturing the extraction sheet of Example 1.

TABLE 1

| | Layer M Meltblown nonwoven fabric | | | | Layer S Spunbonded nonwoven fabric | | | | Extraction Sheet | Evaluation | |
| --- | --- | --- | --- | --- | --- | --- | --- | --- | --- | --- | --- |
| Sample | Crystallinity % | Softing Point ° C. | Fiber Diameter μm | Basis Weight g/m² | Crystallinity % | Softing Point ° C. | Fiber Diameter μm | Basis Weight g/m² | Bending Hysteresis gf · cm/cm | Tensile Strength N/15 mm | Crease Line |
| a | 3.0 | 65 | 10.5 | 6.0 | 36.2 | 160 | 20.3 | 12.0 | $9.5 \times 10^{-3}$ | 12.5 A | A |
| b | 5.0 | 85 | 10.0 | 6.0 | 36.2 | 160 | 20.3 | 12.0 | $8.1 \times 10^{-3}$ | 13.5 A | A |
| c | 7.5 | 110 | 9.5 | 6.0 | 36.2 | 160 | 20.3 | 12.0 | $5.9 \times 10^{-3}$ | 13.5 A | A |
| d | 9.0 | 120 | 8.0 | 6.0 | 36.2 | 160 | 20.3 | 12.0 | $5.0 \times 10^{-3}$ | 13.8 A | B |
| e | 11.4 | 115 | 8.0 | 6.0 | 36.2 | 160 | 20.3 | 12.0 | $4.7 \times 10^{-3}$ | 13.8 A | C |
| f | 17.0 | 140 | 6.5 | 6.0 | 36.2 | 160 | 20.3 | 12.0 | $4.5 \times 10^{-3}$ | 15.1 A | C |
| g | 3.0 | 65 | 10.5 | 6.0 | 25.5 | 155 | 41.0 | 12.0 | $4.8 \times 10^{-3}$ | 10.8 A | C |
| h | 3.0 | 65 | 10.5 | 6.0 | 30.0 | 158 | 35.0 | 12.0 | $9.2 \times 10^{-3}$ | 11.4 A | A |
| i | 3.0 | 65 | 10.5 | 6.0 | 60.0 | 170 | 15.8 | 12.0 | $10.3 \times 10^{-3}$ | 16.4 A | A |
| j | 3.0 | 65 | 10.5 | 1.5 | 36.2 | 160 | 20.3 | 12.0 | $4.3 \times 10^{-3}$ | 10.9 A | C |
| k | 3.0 | 65 | 10.5 | 2.0 | 36.2 | 160 | 20.3 | 12.0 | $5.1 \times 10^{-3}$ | 11.2 A | B |
| l | 3.0 | 65 | 10.5 | 3.0 | 36.2 | 160 | 20.3 | 12.0 | $6.5 \times 10^{-3}$ | 11.4 A | A |
| m | 3.0 | 65 | 10.5 | 30.0 | 36.2 | 160 | 20.3 | 12.0 | $11.1 \times 10^{-3}$ | 20.4 A | A |
| n | 3.0 | 65 | 10.5 | 4.5 | 36.2 | 160 | 20.3 | 4.0 | $14.3 \times 10^{-3}$ | 5.8 C | A |
| o | 3.0 | 65 | 10.5 | 5.5 | 36.2 | 160 | 20.3 | 5.0 | $14.5 \times 10^{-3}$ | 7.2 B | A |
| p | 3.0 | 65 | 10.5 | 5.5 | 36.2 | 160 | 20.3 | 7.0 | $14.2 \times 10^{-3}$ | 10.1 A | A |
| q | 3.0 | 65 | 10.5 | 6.5 | 36.2 | 160 | 20.3 | 25.0 | $6.0 \times 10^{-3}$ | 26.0 A | A |
| r | 3.0 | 65 | 10.5 | 6.5 | 36.2 | 160 | 20.3 | 30.0 | $5.3 \times 10^{-3}$ | 35.8 A | B |
| s | 3.0 | 65 | 10.5 | 6.5 | 36.2 | 160 | 20.3 | 35.0 | $4.8 \times 10^{-3}$ | 48.7 A | C |

The "evaluation" in Table 1 was performed according to the following criteria. Tensile Strength A: The extraction sheet has a sufficiently high tensile strength, is highly firm, and is extremely hardly broken or deformed in the manufacture of the extraction filters or the like.

B: The extraction sheet has a high tensile strength, is firm, and is hardly broken or deformed in the manufacture of the extraction filters or the like.

C: The extraction sheet has an insufficient tensile strength, and is possibly broken or deformed in the manufacture of the extraction filters or the like.

Crease Line

A: The crease line remains clearly, which is a highly creasable condition.

B: The crease line remains, which is a creasable condition.

C: No crease line remains, or any remaining crease line almost disappears in a few minutes, which is hardly creasable condition.

Table 1 can indicate the following items.

That is, Samples a to d show that when the polylactic acid resin forming the meltblown nonwoven fabric of the layer M has a crystallinity of 9.0% or lower, the samples have a bending hysteresis of $5.0\times10^{-3}$ gf·cm/cm or larger, and are creasable. Particularly, Samples a to c show that when the polylactic acid resin has a crystallinity of 7.5% or lower, the samples have a bending hysteresis of $5.9\times10^{-3}$ gf·cm/cm or larger, and are highly creasable.

In contrast, Samples e and f show that when the polylactic acid resin has a crystallinity of 10.0% or higher, the samples have a bending hysteresis of $4.7\times10^{-3}$ gf·cm/cm or smaller, and are hardly creasable.

In addition, Samples k to m show that when the meltblown nonwoven fabric of the layer M has a basis weight of 2.0 to 30.0 g/m², the samples have a bending hysteresis of $5.1\times10^{-3}$ to $11.1\times10^{-3}$ gf·cm/cm, and are creasable. Particularly, Samples 1 and m show that when the nonwoven fabric has a basis weight of 3.0 to 30.0 g/m², the samples have a bending hysteresis of $6.5\times10^{-3}$ to $11.1\times10^{-3}$ gf·cm/cm, and are highly creasable.

In contrast, Sample j shows that when the nonwoven fabric has a basis weight of 1.5 g/m², the sample has a bending hysteresis of $4.3\times10^{-3}$ gf·cm/cm, and is hardly creasable.

Furthermore, Samples h and i show that when the fibers constituting the spunbonded nonwoven fabric of the layer S have a fiber diameter of 35.0 μm or smaller, the samples have a bending hysteresis of $9.2\times10^{-3}$ gf·cm/cm or larger, and are highly creasable.

In contrast, Sample g shows that when the fibers have a fiber diameter of 41.0 μm, the sample has a bending hysteresis of $4.8\times10^{-3}$ gf·cm/cm, and is hardly creasable.

In addition, Samples o to r show that when the spunbonded nonwoven fabric of the layer S has a basis weight of 5.0 to 30.0 g/m², the samples have a bending hysteresis of $5.3\times10^{-3}$ to $14.5\times10^{-3}$ gf·cm/cm, and are creasable. Particularly, Samples o to q show that when the nonwoven fabric has a basis weight of 5.0 to 25.0 g/m², the samples have a bending hysteresis of $6.0\times10^{-3}$ to $14.5\times10^{-3}$ gf·cm/cm, and are highly creasable.

In contrast, Sample s shows that when the nonwoven fabric has a basis weight of 35.0 g/m², the sample has a bending hysteresis of $4.8\times10^{-3}$ gf·cm/cm, and is hardly creasable.

Furthermore, Samples o to r show that when the nonwoven fabric has a basis weight of 5.0 to 30.0 g/m², the samples have a tensile strength as high as 7.2 to 35.8 N/15 mm. Particularly, Samples p to r show that when the nonwoven fabric has a basis weight of 7.0 to 30.0 g/m², the samples have a tensile strength as sufficiently high as 10.1 to 35.8 N/15 mm.

In contrast, Sample n shows that when the nonwoven fabric has a basis weight of 4.0 g/m², the sample has a tensile strength as low as 5.8 N/15 mm, which is not sufficient.

Next, Samples a to d show that when the polylactic acid resin forming the meltblown nonwoven fabric of the layer M has a crystallinity of 3.0 to 9.0%, the resin has a softening point of 65 to 120° C. In addition, Samples h and i show that when the polylactic acid resin forming the spunbonded nonwoven fabric of the layer S has a crystallinity of 30.0 to 60.0%, the resin has a softening point of 158 to 170° C.

Consequently, the Samples a to d, h and i show that the softening point of the polylactic acid resin forming the meltblown nonwoven fabric is at least 30° C. lower than that of the polylactic acid resin forming the spunbonded nonwoven fabric.

INDUSTRIAL APPLICABILITY

The extraction sheet according to the present invention can find application in the field of the extraction sheet, the extraction filter, and the extraction bag used for extraction of beverages such as black tea, green tea, and coffee, liquid food such as soup stock, drugs such as Kampo products, quasi drugs such as bath salts, or the like, because the extraction sheet has high machinability in the manufacture of the extraction filter using the same and the extraction bag using the same, and the extraction filter and the extraction bag have high handling property.

REFERENCE SIGNS LIST 1 extraction filter
2 filter section
3 surface-welded section
4 upper edge
5 crease line
6 extraction bag
7 bag body
8 string
9 tag
10 linear-welded section
11 crease line
12 extraction bag
13 bag body
14 surface-welded section
15 crease line

The invention claimed is:

1. An extraction sheet having a multi-layered structure comprising:
    a layer (layer M) including a meltblown nonwoven fabric that is formed from fibers of a polylactic acid-based resin having a crystallinity of 9.0% or lower and a fiber diameter of 15.0 μm or smaller and that has a basis weight of 2.0 to 30.0 g/m², and
    a layer (layer S) including a spunbonded nonwoven fabric that is formed from fibers of a polylactic acid-based resin having a crystallinity of 30.0 to 60.0% and a fiber diameter of 35.0 μm or smaller and that has a basis weight of 5.0 to 30.0 g/m²,
    wherein the extraction sheet has a bending hysteresis of $5.0\times10^{-3}$ to $14.5\times10^{-3}$ gf·cm/cm.

2. The extraction sheet according to claim 1, wherein the fibers constituting the meltblown nonwoven fabric and the fibers constituting the spunbonded nonwoven fabric each have a fiber diameter of 0.5 μm or larger.

3. The extraction sheet according to claim 1, wherein the resin forming the meltblown nonwoven fabric has a softening point of 60 to 120° C., and the softening point is at least 30° C. lower than a softening point of the resin forming the spunbonded nonwoven fabric.

4. An extraction filter comprising the extraction sheet according to claim 1,
    wherein the extraction filter is formed by welding and sealing the extraction sheet at a predetermined location with the layer M of the extraction sheet placed inside.

5. An extraction bag comprising the extraction sheet according to claim 1,
wherein the extraction filter formed by welding and sealing the extraction sheet at a predetermined location with the layer M of the extraction sheet placed inside to form a bag body with which an extraction material has been filled.

6. The extraction sheet according to claim 2, wherein the resin forming the meltblown nonwoven fabric has a softening point of 60 to 120° C., and the softening point is at least 30° C. lower than a softening point of the resin forming the spunbonded nonwoven fabric.

7. An extraction filter comprising the extraction sheet according to claim 2,
wherein the extraction filter is formed by welding and sealing the extraction sheet at a predetermined location with the layer M of the extraction sheet placed inside.

8. An extraction filter comprising the extraction sheet according to claim 3,
wherein the extraction filter is formed by welding and sealing the extraction sheet at a predetermined location with the layer M of the extraction sheet placed inside.

9. An extraction filter comprising the extraction sheet according to claim 6,
wherein the extraction filter is formed by welding and sealing the extraction sheet at a predetermined location with the layer M of the extraction sheet placed inside.

10. An extraction bag comprising the extraction sheet according to claim 2,
wherein the extraction filter formed by welding and sealing the extraction sheet at a predetermined location with the layer M of the extraction sheet placed inside to form a bag body with which an extraction material has been filled.

11. An extraction bag comprising the extraction sheet according to claim 3,
wherein the extraction filter formed by welding and sealing the extraction sheet at a predetermined location with the layer M of the extraction sheet placed inside to form a bag body with which an extraction material has been filled.

12. An extraction bag comprising the extraction sheet according to claim 6,
wherein the extraction filter formed by welding and sealing the extraction sheet at a predetermined location with the layer M of the extraction sheet placed inside to form a bag body with which an extraction material has been filled.

* * * * *